May 18, 1965     E. W. WARTENBERG     3,184,299
GLASS TEMPERING APPARATUS

Filed Aug. 8, 1960     2 Sheets-Sheet 1

INVENTOR
Erwin Wartenburg
BY Michael S. Striker
ATTORNEY

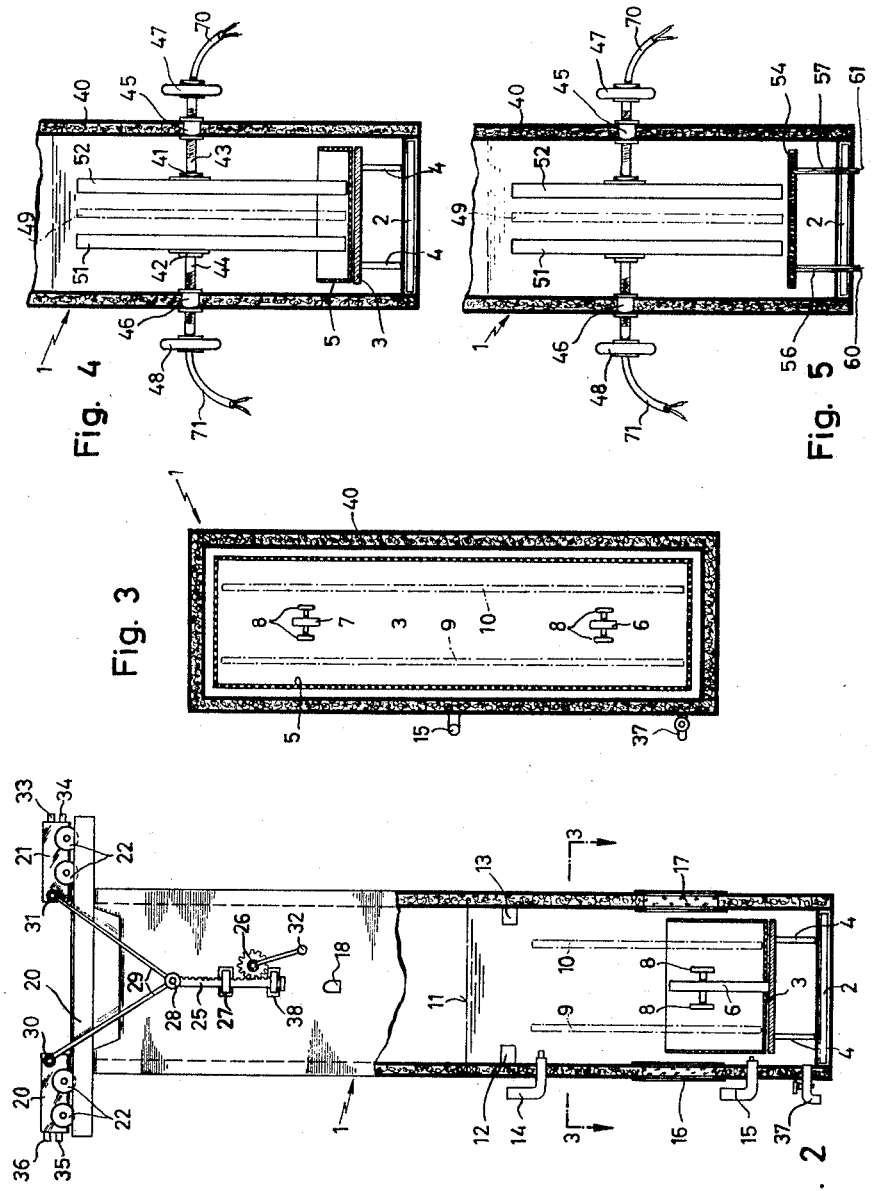

3,184,299
GLASS TEMPERING APPARATUS
Erwin W. Wartenberg, Gahkopf 20, Stuttgart, Germany
Filed Aug. 8, 1960, Ser. No. 48,244
Claims priority, application Germany, Aug. 18, 1959,
W 26,232
2 Claims. (Cl. 65—348)

The present invention relates to an apparatus for tempering glass by quenching the same in a boiling liquid.

It is known in the art of glass making to temper glass by rapidly cooling it in liquids, for example, oil, or in molten salts. The glass which is heated to the softening range is then usually immersed by suitable means into the respective liquid which is kept in an open container. No noticeable vaporization of these liquids occurs by this operation since they have a high boiling point and are used at a temperature far below that point.

In deviation from the above-mentioned method, it has also been proposed to utilize boiling organic liquids for tempering glass. The glass is then immersed into a quenching bath which consists of a boiling liquid, the molecules of which have no or only a very small affinity to the glass. In this method, a gas envelope is continuously formed about the glass which prevents the glass while still in a plastic condition from coming into direct contact with the liquid with the result that the glass will cool uniformly and attain a better surface quality than by the older methods as above described.

The tempering of glass by quenching it in a boiling liquid cannot be properly carried out in an open container since the continuously formed gas envelope would then escape upwardly, so that considerable amounts of liquid would be lost by evaporation which would render this method very uneconomical. The amount of liquid which is transformed into a gaseous condition depends upon the heat capacity of the glass and may amount to about 6 liters and more depending upon the dimensions of the glass to be tempered. This method therefore requires an entirely new quenching procedure which cannot be properly carried out with any of the conventional apparatus which were previously used for tempering glass. If it were possible, however, to provide a suitable apparatus, this method would produce considerable advantages since it would then be possible to quench several glass plates or other glass objects simultaneously adjacent to each other, contrary to the only other method which has reached a certain degree of perfection, namely, the air-cooling method which does not even permit two glass plates to be treated next to each other in the required cooling box. Furthermore, if curved glass plates are to be cooled, the cooling boxes always have to be built according to such shape, which entails considerable work and expense.

It is an object of the present invention to provide an apparatus which overcomes the disadvantages of the methods and apparatus as were previously known and which permits glass of any desired shape to be cooled by means of a boiling liquid, and which further permits this quenching method to be carried out very economically by recovering the vaporized liquid by a condensation of the gases. The new apparatus has the further advantages that several glass plates may be cooled simultaneously adjacent to each other and that the cooling container does not need to be made of a shape in accordance with the shape of the particular glass object to be cooled.

The present invention differs from the apparatus which are known for a similar purpose primarily by the provision of a heatable container for the cooling liquid which has an elongated shape and is provided with heat-insulating walls and a cooled cover. The heating means of this apparatus are preferably provided within the bottom of the container, although additional heating elements may also be provided on the lateral walls thereof. According to a preferred embodiment of the invention, the container is provided with double walls and the heat-insulating means are disposed between the walls. It is further advisable to provide at the inside of the container closely above the bottom thereof a plate for screening or shielding the glass objects to be cooled from the layer of liquid which is disposed directly above the bottom of the container. This screening or shielding plate is made of a size so as to leave an adequate space between the peripheral edges of the plate and the walls of the container to insure a proper circulation of the liquid.

The screening plate itself is provided with vertical supports which are mounted within the central longitudinal plane of the container in a spaced relation to each other. These supports are provided with lateral buffers of graphite or a similar material for preventing the glass plates which are to be cooled from being excessively swung in lateral directions by the upward flow of the gas envelope which is being generated from the liquid. The screening plate further supports a screen-wire box which is provided for collecting broken glass and which may be lifted out of the container by means of long hooks. The screening plate may also be combined with the perforated box by forming the bottom thereof, and it is provided with legs for supporting it on the bottom of the container.

Another feature of the invention resides in the provision of a cover for the container which consists of a pair of cooling boxes which are movable on rollers or wheels.

Another feature of the invention consists in providing within the container a plurality of flat immersion heating elements, the flat surfaces of which extend parallel to the longitudinal walls of the container and also parallel to the glass plates which are inserted into the container, and which are adapted to be adjusted to different distances from each other. These immersion heating elements are preferably provided with a greater surface area than that of the glass plates to be quenched so as to extend at all sides beyond the glass plates.

According to the invention it is further advisable to provide an additional heating element within the container and within a plane parallel to and spaced from the bottom thereof. This additional heating element is spaced at only a short distance from the lower edges of the vertical heating elements and insures that the glass objects will be very effectively surrounded by a gas envelope at all sides.

These and additional objects, features, and advantages of the present invention will become further apparent from the following detailed description thereof, particularly when the same is read with reference to the accompanying drawings, in which—

FIGURE 2 shows an end view of the container, partly in section, as seen in the direction of the arrow A in FIGURE 1;

FIGURE 3 shows a cross section of the container taken along line 3—3 of FIGURE 2;

FIGURE 4 shows a vertical cross section similar to FIGURE 2 of the lower part of a cooling container with a pair of heating elements at the inside of the container; while FIGURE 5 shows a view similar to FIGURE 4 of a cooling container which is provided with another heating element in addition to those shown in FIGURE 4.

Figure 1:
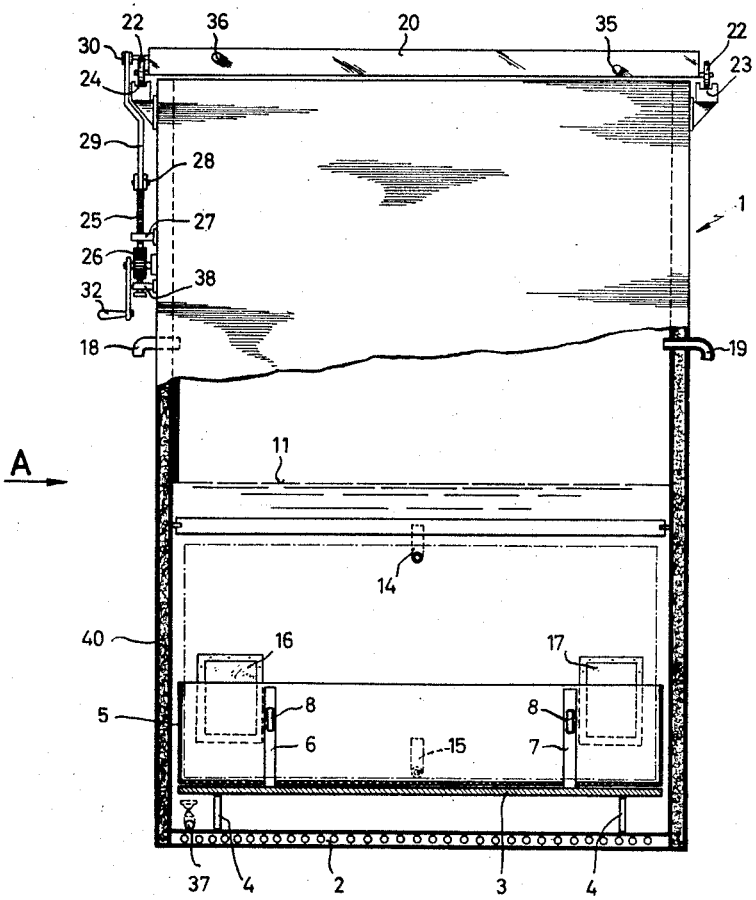
FIGURE 1 shows an elevation of the cooling container, partly broken away and shown in section.

Referring to the drawings, and first particularly to FIGURES 1 to 3 thereof, the apparatus according to the invention consists of a container 1 of sheet steel which is provided with double walls. The space between these double walls is filled out with insulating material 40, for example, glass wool. Due to this insulation, the liquid within the container will be protected as much as possible from being cooled by the outer air, which is important especially if the difference in the temperatures of the liquid and of the outer air is considerable. Actual tests have shown that the cooling effect of the outer air upon a container which is not insulated is so strong that considerable amounts of colder liquid will become deposited in the bottom of the container and, because of the greater density of this colder liquid, it will form a layer of a thickness of several centimeters on the container bottom. When inserting the heated glass plate into the container, the suction produced by the gas envelope which is then being formed around the glass plate causes this cold liquid to surge upwardly and against the lower edge of the glass, and it thereby prevents the continuous enclosure of the glass plate by a gas envelope and results in a destruction of the plate. If the tempering operation is carried out in boiling liquids, the temperature of the liquid should under no circumstances be lower than a few degrees below its boiling point since otherwise the glass plate is liable to be destroyed. The temperature difference between the center and the bottom of uninsulated containers was measured to be, for example, 15° C. The destruction of the plate then usually occurred within 10 to 12 seconds, whereas the quenching operation by means of the liquids according to the present method requires as much as 50 to 60 seconds.

According to the invention, the container 1 is provided within its double bottom with heating elements 2 for heating the liquid. Above the bottom, a screening plate 3 is provided which consists of sheet aluminum or similar material and is supported on the bottom of container 1 by legs 4. Screening plate 3 is made of such a size that an adequate space remains between its peripheral edges and the walls of the container to allow for a proper circulation of the liquid. Screening plate 3 is provided especially for the purpose of preventing the colder liquid which might possibly form along the container walls from reaching the lower edge of the glass plate which is to be tempered.

Screening plate 3 also supports a box 5 of screen wire for collecting broken glass. This box 5 together with screening plate 3 may be lifted out of container 1 by means of long hooks or the like. Within the perforated box 5 and within the central longitudinal vertical plane of the container, screening plate 3 also carries a pair of supports 6 and 7 which are provided with lateral buffers 8 of graphite or similar material for preventing the glass plates from swinging too strongly under the action of the upward flow of the gas envelope, which might otherwise lead to the formation of cracks extending from the suspension tongs. These buffers 8 will also prevent two glass plates 9 and 10 which are immersed simultaneously into container 1 from hitting against each other.

In order to heat the liquid to its boiling point and to maintain it at that temperature, not only the heating elements 2 are used which are mounted in the double bottom of the container, but also two additional heating elements 12 and 13 which are mounted on the inner walls of the container below the liquid level 11 and serve for heating the liquid more quickly and also for quickly reheating the liquid which is being condensed during the cooling process and drips back into the contatiner.

For maintaining the liquid at a constant boiling temperature within container 1, a pair of thermostats 14 and 15 are provided therein at different levels.

The side walls of container 1 are further provided at a level near the lower edges of the glass objects to be treated with observation windows 16 and 17 which consist of strong laminated glass and permit especially the lower edges of these immersed glass objects to be observed.

Above the liquid level 11, the container walls contain ducts 18 and 19 through which a protective gas, for example, $CO_2$ or $N_2$, may be inserted in the event that the tempering operation is carried out by means of combustible gases.

Container 1 is adapted to be closed by a cover which, according to the invention, consists of a pair of cooling boxes 20 and 21 which, as shown in FIGURE 1, are movable on rollers or wheels 22 along rails 23 and 24. The movement of these cooling boxes 20 and 21 is produced by means of a drive mechanism which consists of a gear rack 25 and a gear 26 which is in mesh with the rack and is driven either by a handcrank 32 or by a motor. The vertical movement of rack 25 which is slidably guided in bearings or the like 27 and 38 is transmitted through a joint 28, a pair of connecting rods 29, and joints 30 and 31 to the cooling boxes 20 and 21 which are thus moved toward or away from each other to the open or closed position depending upon the direction of movement of rack 25.

Cooling boxes 20 and 21 are provided with inlets and outlets 33, 34, 35 and 36 to which flexible hoses may be connected for circulating cooling water therethrough.

At the lower end of container 1, an outlet valve 37 is provided for discharging the cooling fluid.

Container 1 is to be mounted in a fixed position and preferably in line with or below a tempering furnace, not shown, from which the glass plates after being heated to a temperature near their softening point are moved by means of a conventional conveying mechanism, not shown, to a point above the opening of the container and then into the container until they are submerged in the liquid to a point below the level 11 thereof. Thereafter, container 1 is closed, except for an opening of a few millimeters, by a movement of the cooling boxes 20 and 21 toward each other, and it will not again be opened until the quenching process has been completed. After the glass plate has been cooled down to the boiling temperature of the liquid, the cooling boxes are moved apart so as to open the container, and the glass plate is then lifted out of the container and removed from the suspension and conveying mechanism. The glass is then properly tempered, clear, clean, and optically of perfect quality.

The cooling liquid may consist, for example, of carbon tetrachloride. According to the invention, a space of approximately 80 cm. is left free of any liquid between the liquid level 11 and the upper edge or the cover of container 1. By providing such a relatively large distance between the liquid level 11 and the upper end of the container, the liquid will be prevented from boiling over during the quenching operation. Furthermore, the gas which has been evaporated from the liquid can thus travel a long distance in which it may again condense, and it will therefore not escape from the container when the cover is opened after the cooling operation is completed since it is then already condensed. It has been found that a condensing distance of about 80 cm. is sufficient to prevent the escape of gas completely.

The embodiment of the invention as illustrated in FIGURE 4 differs from the embodiment as previously described by the provision of a pair of flat immersion heating elements 51 and 52 at the inside of the container 1 in place of the heating elements 12 and 13 as shown in FIGURE 2. Those parts in this embodiment which are similar to those which are shown in FIGURES 1 to 3 are also indicated by the same reference numerals as previously applied. The heating elements 51 and 52 are provided in container 1 so as to extend parallel to the central vertical longitudinal plane thereof and parallel to the glass plates which are immersed in the quenching bath. Furthermore, heating elements 51 and 52 are adjustable relative to each other and each of them is for this purpose provided with a threaded spindle 43 or 44, respectively, which is connected to the respective heating element by a connecting plate 41 or 42 and is passed liquid-tight through the respective double wall of the container by means of a threaded bushing 45 or 46, respectively. By operating the hand wheels 47 and 48 it is then easily possible to adjust the two heating plates 51 and 52 to the desired distance from each other. Spindles 43 and 44 are of a tubular shape so that cables 70 and 71 may be passed therethrough to be connected to the heating plates to supply the necessary electric current thereto.

This apparatus according to FIGURE 4 has the advantage that the vaporization of the liquid is especially effective between the heating elements 51 and 52 so that the formation of a gas envelope which completely encloses the glass plate 49 during the quenching operation will be insured and prolonged. This permits also such liquids to be applied for tempering the glass which, because of their high heat of vaporization, would—without these heating means—not insure that the gaseous phase will be maintained for a sufficient length of time, and which would then not be usable for tempering glass objects according to the present method since they are then liable to break in the quenching bath.

This apparatus according to FIGURE 4 may also be advantageously applied for varying the degree of temper of the glass to be hardened by means of a particular quenching liquid since the degree of temper is likewise dependent upon the length of time during which the gaseous phase is maintained. If the degree of temper is to be high, the gaseous phase must be of a shorter duration than if a lower degree of temper is to be attained. By varying the length of the heating period of the two heating elements 51 and 52 it is possible to attain any desired degree of temper with the same quenching liquid.

The distance between the two heating plates 51 and 52 must be adjusted so that, after the heating system is switched on, the largest amount of the liquid between these plates will be transformed into a gaseous condition. For this purpose it is necessary to adjust the distance between plates 51 and 52 so as to be in accordance with the heat of vaporization of the particular liquid applied. If the liquid has a lower heat of vaporization, the distance must be made greater than if a liquid is used which has a higher heat of vaporization. The particular distances to be set between the heating plates for different kinds of quenching liquids are preferably determined experimentally prior to the actual quenching operation.

The further embodiment of the invention as illustrated in FIGURE 5 differs from that according to FIGURE 4 primarily by the provision of an additional heating element 54 within container 1. This heating element 54 is mounted on supports 56 and 57 so as to extend parallel to the container bottom and preferably at such a distance from the bottom that the vertical heating plates 51 and 52 will be closely adjacent to heating element 54 so that the glass body to be quenched will be completely enclosed on three sides. The liquid which is contained between the three heating elements 51, 52, and 54 will then be very quickly transformed into the gaseous condition.

The electric cables 60 and 61 leading to heating element 54 may be passed through the hollow legs 56 and 57 which support the heating element. The screening plate 3 as provided in the other embodiments may in this case be omitted.

The present invention is by no means limited to the particular embodiments as illustrated and described. Thus, instead of using two movable cooling boxes to form the cover of the container it is also possible to use a single stationary cooling box to cover the entire opening of the container. This cooling box may then be provided with a slot through which the glass plate to be cooled is inserted. This has, however, the disadvantage that the container cannot be completely closed which is especially of importance if the quenching liquids to be used are combustible. It would then also be necessary to provide differently slotted inserts for differently curved glass objects and the slot would have to be made very narrow in order to prevent the escape of gas which, in turn, would render the insertion of the glass into the container rather difficult.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for tempering glass plates comprising, in combination, an upright container having a bottom wall and a peripheral wall and being open at the top thereof; a quenching liquid in said container partly filling the same so as to define between the liquid level and the top of the container a free space; heating means in said container below the level of the quenching liquid therein for heating said quenching liquid therein substantially up to its boiling point; heat-insulating means coordinated at least with said peripheral wall for substantially preventing any heat loss therethrough; means for suspending a hot glass plate to be tempered in said quenching liquid so that the latter completely surrounds said plate and so that a vapor layer will form about the hot glass plate suspended in said quenching liquid; cover means extending transversely over said open end of said container for substantially closing the same and including cooling means for cooling said cover means over the whole area of said open end so that vapors forming during suspension of a hot glass plate in the heated quenching liquid will rise through said free space and will be condensed by contact with said cooled cover means and flow back in form of cooled condensate to mix at the bottom of the container with the remainder of the quenching liquid, whereby escape of quenching material in form of vapors from said container will be substantially prevented; and shielding means in said container for preventing contact of any cooled part of said quenching liquid with said hot glass plate.

2. The apparatus of claim 1 in which said shielding means is constituted by a solid plate having a peripheral edge defining an area smaller than the transverse cross section of said container; and support means supporting said plate in substantially horizontal position in said container spaced from the bottom wall thereof and the peripheral edge of said plate spaced from the peripheral wall of said container.

References Cited by the Examiner

UNITED STATES PATENTS

| | | | |
|---|---|---|---|
| 161,380 | 3/75 | Boyer | 263—2 |
| 928,860 | 7/09 | Farling | 65—31 |
| 2,823,491 | 2/58 | Long | 65—114 |
| 2,968,893 | 1/61 | Pilkington | 65—65 |
| 3,024,298 | 3/62 | Goltsos et al. | 165—105 X |

FOREIGN PATENTS 197,980   5/58   Austria.

DONALL H. SYLVESTER, *Primary Examiner.*

ARTHUR P. KENT, WILLIAM B. KNIGHT, *Examiners.*